United States Patent [19]

Kwon et al.

[11] Patent Number: 5,081,692
[45] Date of Patent: Jan. 14, 1992

[54] UNSHARP MASKING USING CENTER WEIGHTED LOCAL VARIANCE FOR IMAGE SHARPENING AND NOISE SUPPRESSION

[75] Inventors: Heemin Kwon, Pittsford; Jeanine T. Liang, Rochester, both of N.Y.

[73] Assignee: Eastman Kodak Company, Rochester, N.Y.

[21] Appl. No.: 681,464

[22] Filed: Apr. 4, 1991

[51] Int. Cl.$^5$ ............................................. G06K 9/40
[52] U.S. Cl. ....................................... 382/54; 382/41; 358/447
[58] Field of Search ....................... 382/54, 33, 41, 34, 382/14; 358/75, 447, 284, 166; 364/413.13

[56] References Cited

U.S. PATENT DOCUMENTS 4,315,318  2/1982  Kato et al. ............................. 382/54
4,571,635  2/1986  Mahmoodi et al. ................... 382/54

Primary Examiner—Michael Razavi
Attorney, Agent, or Firm—Edward Dugas

[57] ABSTRACT

A pseudo center weighted local variance in the neighborhood of an image pixel determines the amplification factor multiplying the difference between the image pixel and its blurred counterpart before it is combined with the original image. The amplification factor is computed for each pixel in the image, and varies from a minimum value of about $-1$ when the center weighted variance is at a minimum value to some maximum value when the center weighted variance reaches a maximum value. The pseudo center weighted variance is computed by convolving the local neighborhood surrounding each image pixel with a kernel of center weights having a maximum value at the center pixel. The pseudo center weighted variance is the difference between the center weighted mean of the source of the local neighborhood of image pixels and the square of the center weighted mean. Both image sharpening and noise suppression is achieved in the same image by permitting the amplification factor to vary between a fraction of unity and greater than unity as the center weighted variance varies from a low value (uniform image) to a higher value (textured image).

9 Claims, 5 Drawing Sheets

UNSHARP MASKING USING CENTER WEIGHTED LOCAL VARIANCE FOR IMAGE SHARPENING AND NOISE SUPPRESSION

This is a continuation of application Ser. No. 290,655, filed Dec. 28, 1988 and now abandoned.

BACKGROUND OF THE INVENTION

Unsharp masking is a well-known technique for enhancing the sharpness of processed images. Specifically, an original digitized image is stored from which a blurred version may be created by convolving it with a low pass filter (such as an unsharp mask). The difference between the blurred image and its original is multiplied by a factor K, and the resulting product is added to the original image to generate a sharpened image. The problem is how to compute the factor K by which the difference image is multiplied.

U.S. Pat. No. 4,571,635 to Mahmoodi et al. teaches that the factor K is computed in accordance with a formula which depends upon the standard deviation of the image pixels in a local neighborhood. While this technique results in some improvement in the sharpness of the image, it would be desirable to obtain further improvement in image sharpness without proportionately amplifying the noise in uniform areas of the image.

SUMMARY OF THE INVENTION

A further significant increase in image sharpness is achieved without the expected proportionate increase in noise amplification in uniform areas of the image in the image process of the present invention. In the present invention, the difference image amplification factor K is not computed in accordance with the standard deviation as in Mahmoodi. Instead it is computed in accordance with a pseudo center weighted variance process. Alternatively, a sharpened center weighted variance process is used in the invention to compute the difference image multiplication factor K. While the idea of center weighting an ensemble of image pixels in a local neighborhood has been disclosed by Kato et al., U.S. Pat. No. 4,315,318, neither Kato et al. nor Mahmoodi et al. have considered such a computation in connection with the determination of the image difference multiplication factor K.

PSEUDO CENTER WEIGHTED VARIANCE

In the pseudo center weighted variance process of the invention, the difference image multiplication factor K is determined for each pixel in the original image in accordance with a pseudo center weighted variance computed for all pixels in a predefined neighborhood surrounding the pixel of interest. Computation of the pseudo center weighted variance, in accordance with the invention, is as follows: The pixels in the neighborhood are individually squared and then convolved with a kernel having the same dimensionality as the neighborhood, the kernel comprising a mask of center weight coefficients whose maximum value lies in the center of the kernel. Further, each pixel in the neighborhood is convolved (without being squared) with the same kernel of center weighted coefficients, and the result of the latter convolution is then taken as a whole and squared, the results of the squaring then being subtracted from the previous convolution. The resulting difference is the pseudo center weighted variance. The difference image multiplication factor K is then determined in accordance with a function that increases as the pseudo center weighted variance increases.

Depending upon the steepness of the topology of the kernel of center weighted coefficients, the resulting sharpened image reproduces the edges in the original image with greater fidelity but without as much accentuation of noise in uniform image areas as might be expected. The image thus provides a significant improvement in the art.

DESCRIPTION OF THE DRAWINGS

The invention may be understood by reference to the accompanying drawings of which:

FIG. 2b is a diagram of a kernel of weighting functions constructed from the three-dimensional function of FIG. 2a;

DETAILED DESCRIPTION

Figure 1:
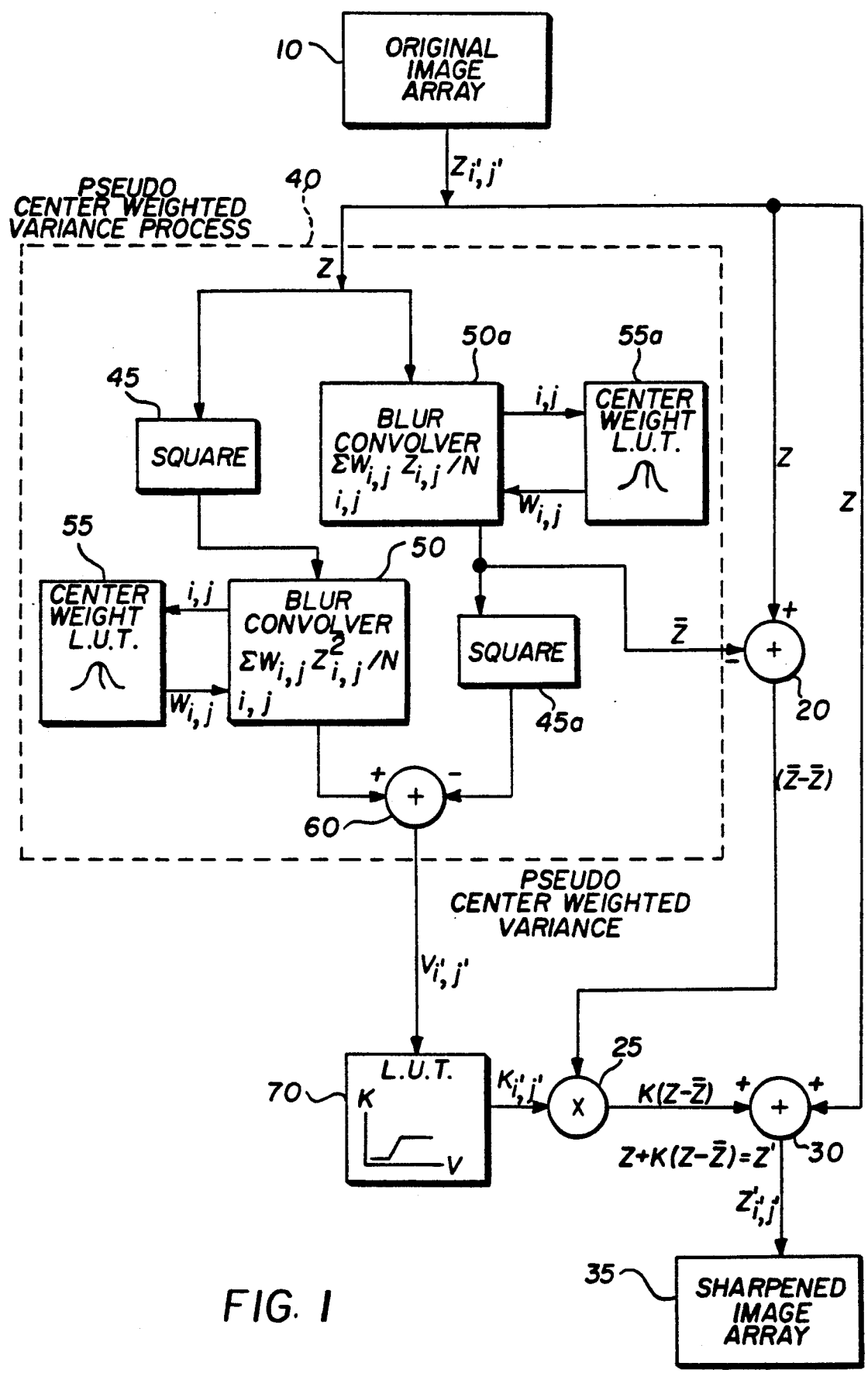
FIG. 1 is a block diagram illustrating the system of the invention.

Referring to FIG. 1, an original image array, comprising a plurality of digitized image pixels defining a two-dimensional image, is stored in a memory 10, each pixel Z being uniquely identified by a two-dimensional symbol $Z_{i,j}$. The unsharp masking process, in accordance with well-known techniques, employs a blurring processor 50a which, in essence, averages each pixel received from the memory 10 with all of its neighbors in a small window of pre-defined size, typically 11 pixels by 11 pixels. The result is a blurred pixel which is then subtracted from the original pixel by a subtractor 20. The difference is then multiplied by a sharpening factor K at a multiplier 25, and the product is then added to the original image at an adder 30. The factor K is proportional to the center weighted variance of a small image neighborhood surrounding the pixel of interest. In local image neighborhoods having fairly large variances, K>0, and the result is a sharpened image pixel $Z'_{i,j}$ which is stored in a memory 35. After all of the image pixels stored in the memory 10 have been thus processed, the array of image pixels in the memory 35 defines a much sharper image than the original array stored in the memory 10.

Reducing the foregoing to an algebraic expression, the system of FIG. 1 constructs the sharpened image $Z'$ from the original and blurred images, $Z$ and $\overline{Z}$ respectively, as follows:

$$Z' = Z + K(Z - \overline{Z}). \tag{0}$$

In one aspect of the invention, it is not always desirable to sharpen the image, particularly in those image areas containing no sharp features, as this would simply boost the noise. The present invention avoids such pitfalls. For example, in somewhat uniform image neighborhoods K may equal 0 so that $Z'=Z$ in Equation (0), which avoids boosting noise because the output image $Z'$ is simply the original image Z. In perfectly uniform image neighborhoods K may equal $-1$ so that $Z'=\bar{Z}$ in Equation (0), which achieves noise suppression because the output image $Z'$ is simply the blurred image $\bar{Z}$. The manner in which the invention provides both sharpening and noise suppression in different neighborhoods of the same image is described hereinbelow with respect to FIGS. 3b and 3c.

PSEUDO CENTER WEIGHTED VARIANCE PROCESS

In the present invention, the sensitivity of the system of FIG. 1 to sharp features in the original image stored in the memory 10, and the fidelity with which such sharp features are reproduced by the system of FIG. 1, are increased without (as would previously have been expected) unduly accentuating noise in uniform areas of the image (areas not containing sharp features). This is done by computing individual sharpening multiplier coefficients $K_{i',j'}$ for each image pixel $Z_{i',j'}$ processed in the system of FIG. 1 in accordance with the pseudo center weighted variance process. A pseudo center weighted variance processor 40 (hereinafter referred to as the pseudo processor 40) performs the computation. Such a processor may be a software- or firmware-programmed machine or may be a dedicated hard-wired processor.

The pseudo processor 40 comprises two branches. In FIG. 1, the first branch comprises a square function 45 which computes the square of the value of each image pixel $Z_{i',j'}$. This branch further comprises a blur convolver 50 and an associated center weight look-up table 55. The look-up table 55 stores a two-dimensional kernel of predetermined size (preferably 11 pixels by 11 pixels) comprising weighting coefficients of which the centermost has the greatest amplitude while the outermost weighting coefficients have the smallest amplitudes, there being a continual variation therebetween.

Figure 2A:
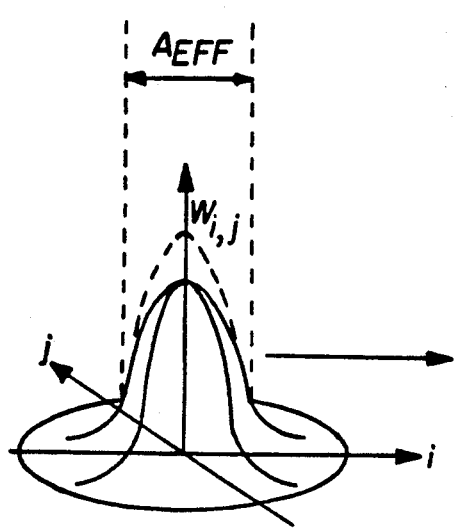
FIG. 2a is a perspective view of a three-dimensional function defining the distribution of center weighted weighting coefficients employed in the system of FIG. 1.

The topology defined by the weighting coefficients stored in the look-up table 55 is illustrated in FIG. 2a. The look-up table 55 stores an $11 \times 11$ kernel such as that illustrated in FIG. 2b, comprising $11^2$ (or 121) weighting coefficients discretely defined at 121 points in an $11 \times 11$ square array. The blur convolver 50 convolves an $11 \times 11$ neighborhood of image pixels taken from the original image array memory 10 surrounding the current pixel of interest, $Z_{i',j'}$, with the corresponding weighting coefficients comprising the 11 pixel by 11 pixel square window of weighting coefficients illustrated in FIG. 2b. The blur convolution performed by the blur convolver 50 performs the following process:

$$\sum_{i=i'-m, j=j'-m}^{i'+m, j'+m} W_{i,j} Z_{i,j}^2/N, \qquad (1)$$

where $$N = \sum_{i,j} W_{i,j} \text{ and } m = \frac{n-1}{2},$$

where n is the size of the kernel. (Note: n=11 in the present example.)

Figure 2B:
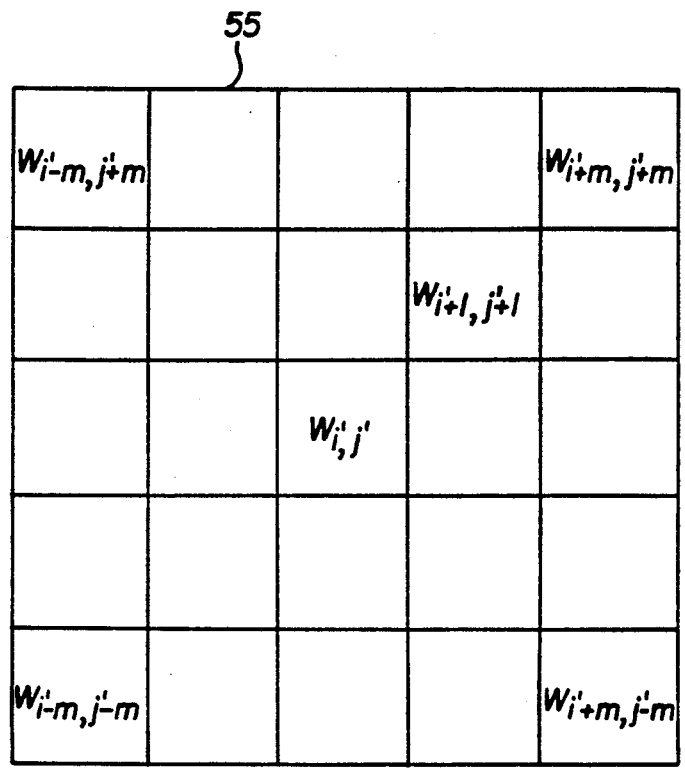
Figure 2C:
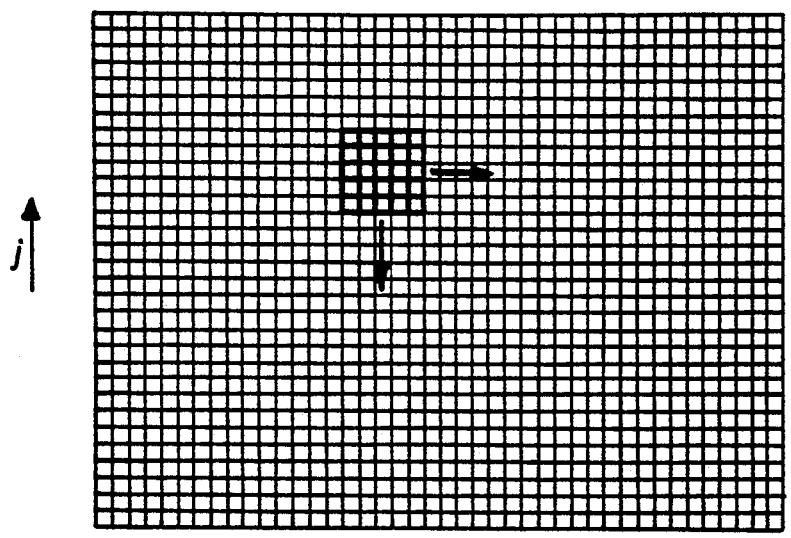
FIG. 2c illustrates the use of the kernel of weighting functions of FIG. 2b in a large image array of pixels by the system of FIG. 1.

The foregoing process is repeated for each pixel in the original image array memory 10, so that the kernel (or "window") of FIG. 2b is, in effect, moved across the two-dimensional image array so as to cover it entirely, one pixel at a time, in the manner illustrated in FIG. 2c.

Each discrete summation computed by the blur convolver 50 is transmitted to the positive input of an adder 60. The negative input of the adder 60 receives a corresponding result computed in the other branch of the pseudo processor 40.

The other branch of the pseudo processor 40 includes a second blur convolver 50a and a center weight look-up table 55a, preferably identical to the first center weight look-up table 55. The blur convolver 50a operates in a manner identical to the blur convolver 50, except that it receives each image pixel $Z_{i',j'}$ from the original array memory 10 without its being squared. Thus, the blur convolver 50a performs the same process except that it works on an array of unsquared image pixels $Z_{i',j'}$. The blur convolver 50a thus performs the following operation:

$$\sum_{i=i'-m, j=j'-m}^{i'+m, j'+m} W_{i,j} Z_{i,j}/N \qquad (2)$$

Each summation performed by the blur convolver 50a is then transmitted as a discrete value to a square function 45a, which functions in the manner identical to that of square function 45, in that it squares the value it receives. The output of the square function 45a is applied to the negative input of the adder 60 which then outputs, for each pixel $Z_{i',j'}$ in the original image array, a pseudo center weighted variance $V_{i',j'}$.

From the foregoing, it should be apparent that the output of the adder 60 is defined as follows:

$$\sum_{i,j} W_{i,j} (Z_{i,j})^2/N - \left[ \sum_{i,j} W_{i,j} Z_{i,j}/N \right]^2. \qquad (3)$$

Each pseudo center weighted variance $V_{i',j'}$ is applied to a look-up table 70 which, in response, furnishes a corresponding sharpening multiplier coefficient $K_{i',j'}$ to the input of the multiplier 25. It should be noted that in the absence the centerweighting feature of the invention, all $w_{i,j}=1$, and the center weighted variance becomes a standard definition of variance.

Figure 3A:
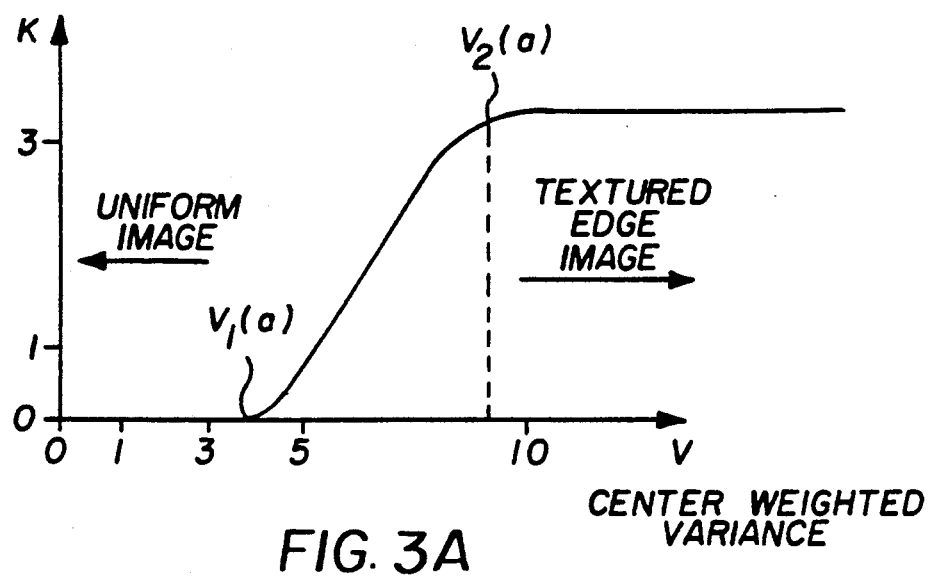
FIGS. 3a and 3b and 3c illustrate alternative computations of the sharpening factor K as a function of the center weighted variance V in the system of FIG. 1.
Figure 3B:
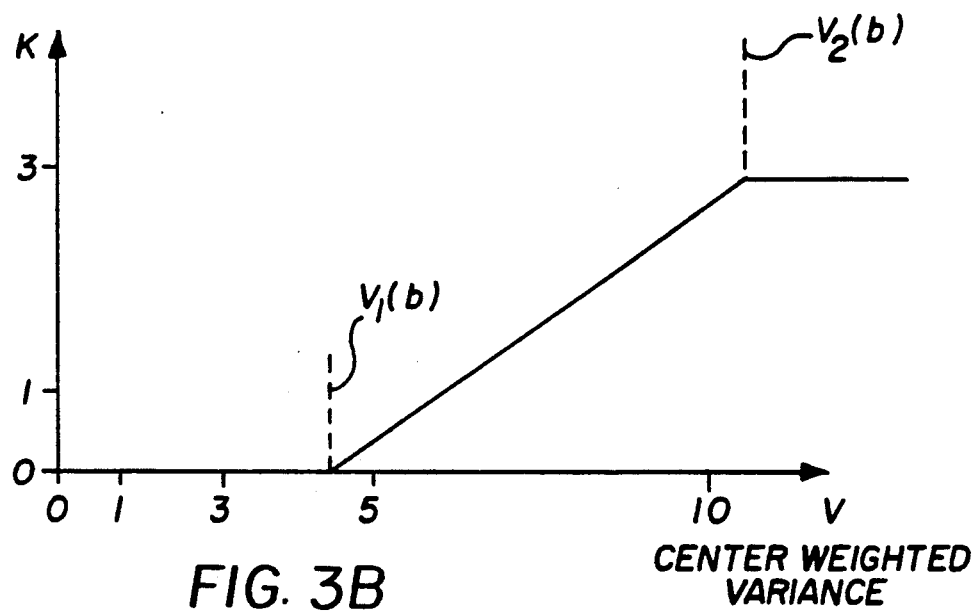

In accordance with the invention, the look-up table 70 defines the multiplier coefficient K as a function of the pseudo center weighted variance V, as illustrated in FIG. 3a. Alternatively, FIG. 3b illustrates a somewhat discontinuous way of defining K in terms of V, in that each knee in the curve is really a sharp corner. Other definitions of K as a function of V are perfectly acceptable within the scope of the invention, the central idea being that a greater variance justifies a greater sharpening of the image and therefore a larger value of the sharpening multiplier coefficient K.

A fairly large kernel ($11 \times 11$ pixels) is preferred to avoid blocking artifacts because the "effective" area $A_{EFF}$ in FIG. 2a is reduced due to the decrease in kernel amplitude at the outer pixels.

CALCULATION OF $V_1$ AND $V_2$

For a given input image or set of input images having the same noise characteristics, the variances $V_1$ and $V_2$ (defining the knees of the curves of FIG. 3) must first be calculated before the image is processed. To calculate $V_1$, a very uniform area in the image is chosen, and the variance value of each of the pixels in the uniform area is computed. $V_1$ is the average of all those variance values.

Figure 4:
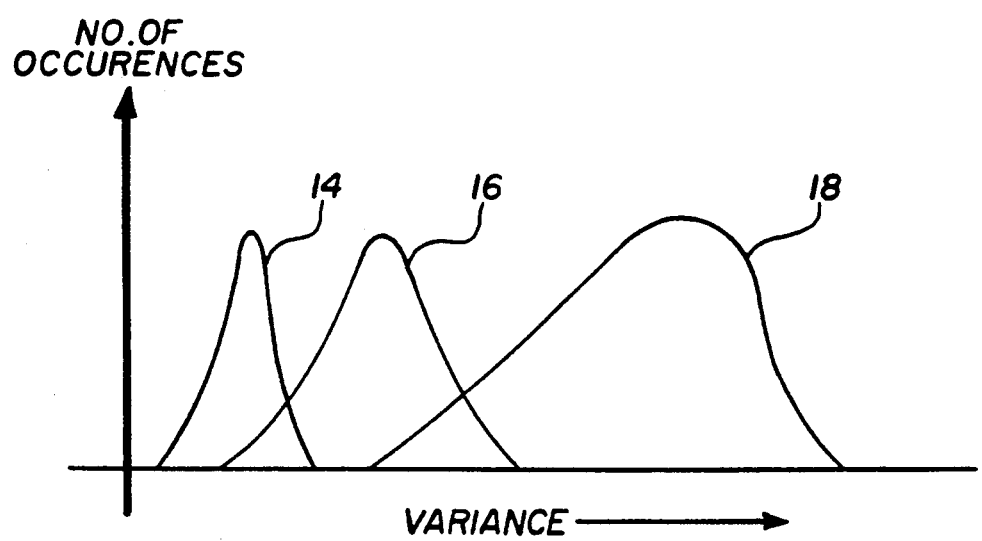
FIG. 4 illustrates the distribution of variance values for uniform, textured and sharp image areas.
Figure 5:
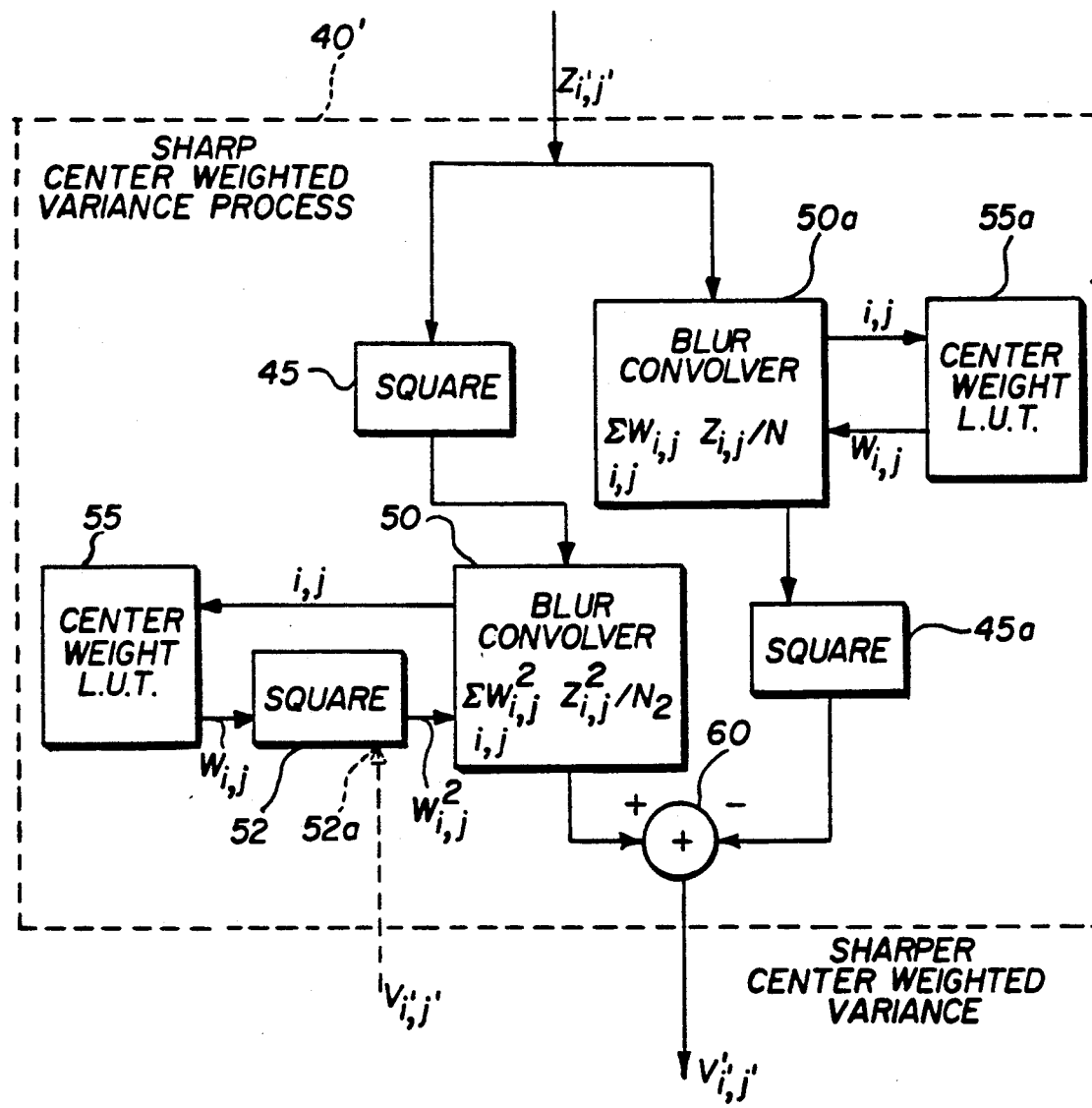
FIG. 5 is a block diagram illustrating an alternative center weighted variance process which may be employed in the system of FIG. 1.

$V_2$ preferably lies between the typical variance value of textured areas and the typical variance value of sharp edge areas in the same image. FIG. 4 is a graph showing variance values plotted against distribution (number of occurrences) for film grain noise (a "uniform" area) (Curve 14), texture (Curve 16), and sharp edge detail (Curve 18) for a typical digital image produced by scanning a photograph. The typical variance values of "texture" and "sharp edge" image areas correspond to the peaks of the curves 16 and 18, respectively, in FIG. 4. $V_2$ is adjusted to find the most natural looking rendition of texture area. Typically, this adjustment is done by varying $V_2$ between the peak variance values of the curves 16 and 18 of FIG. 4 on a trial-by-error basis. Once this optimum value $V_2$ is found, it remains constant for the entire input image and subsequent input images of the same type.

SHARPENING WITH NOISE SUPPRESSION

Figure 3C:
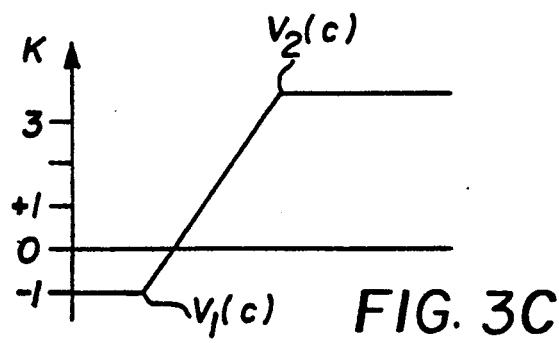

Both image sharpening and noise suppression are achieved in different areas of the same image by employing the amplification factor function illustrated in FIGS. 3b or 3c. Sharpening occurs for values of $k>0$ while noise reduction occurs for values of $-1 \leq k < 0$.

SHARP CENTER WEIGHTED VARIANCE PROCESS

For even greater sensitivity to sharp features in the computation of the center weighted variant, a sharp center weighted variance processor 40' (illustrated in FIG. 4) may be substituted for the pseudo center weighted variance processor 40 in the system of FIG. 1. The sharp center weighted variance processor 40' is virtually identical to the pseudo center weighted variance processor 40, except that a square function 52 is interposed between the output of the center weight look-up table 55 and the blur convolver 50, so that each center weight coefficient $W_{i,j}$ is first squared, to become $W_{i,j}^2$, and the latter is then furnished to the blur convolver 50. (In a simpler embodiment, the square function 52 is implemented in the look-up table 55.) Thus, the sharp center weighted variance computed at the output of the adder 60 is as follows:

$$\sum_{i,j} W_{i,j}^2 (Z_{i,j})^2 / N_2 - \left[ \sum_{i,j} W_{i,j} Z_{i,j} / N \right]^2, \quad (4)$$

where $N_2 = \sum_{i,j} W_{i,j}^2$

The result is that the topology of the weighting coefficients employed in the blur convolver 50 of FIG. 4 is much sharper, corresponding to the dotted line topology suggested in FIG. 2a.

In another variation on FIG. 4, the square function 52 has the ability to raise each weighting coefficient $W_{i,j}$ to any power between unity and 2 (or any other power greater than unity). The power which the variable square function 52 employs is in turn determined by a computation of the pseudo variance by the pseudo variance processor 40, each pseudo variance computed by the pseudo variance processor 40 being applied at a control input 52a of the variable square function 52. Preferably, for smaller values of the pseudo center weighted variance, the variable square function 52 raises $W_{i,j}$ to the minimum power (e.g., unity) while for larger values of the pseudo variance received at its control input 52a, the variable square function 52 raises each center weighted coefficient $W_{i,j}$ to the highest power.

While the invention has been described in detail with specific reference to the accompanying drawings, variations and modifications may be made without departing from the spirit and scope of the invention.

What is claimed is:

1. An image enhancement processing system which receives an original image comprising an array of pixels, comprising:
   a. means for receiving from said array of pixels a value of a pixel and values of pixels in a local neighborhood centered at said pixel;
   b. means for storing first center weighted coefficients of a first kernel and means for storing second center weighted coefficients of a second kernel;
   c. means for generating a center weighted mean at said pixel comprising means for multiplying said first kernel with values of said neighborhood pixels and means for summing the corresponding products and dividing the sum by the number of pixels in said neighborhood;
   d. means for generating an unsharp masking signal at said pixel by subtracting said center weighted mean from the value of said pixel;
   e. means for computing a pseudo variance at said pixel comprising:
      1) means for squaring values of said neighborhood pixels so as to produce squared values of said neighborhood pixels;
      2) means for multiplying said second kernel with said squared values of said neighborhood pixels;
      3) means for producing a sum of the products produced by said means for multiplying and dividing said sum by the total number of pixels in said neighborhood whereby to produce a normalized center weighted sum of squares;
      4) means for squaring said center weighted mean whereby to produce a squared center weighted mean; and
      5) means for subtracting said squared center weighted mean from said normalized center weighted sum of squares;
   f. means for producing a multiplication factor from said pseudo variance; and
   g. means for producing an enhanced pixel value by multiplying said unsharp masking signal by said multiplication factor and adding the resulting product to the value of said pixel.

2. The system of claim 1 wherein said multiplication factor has a positive value which is a function of an amount by which said pseudo variance exceeds a threshold variance typical of neighborhoods of uniform image regions whenever said pseudo variance exceeds said threshold variance.

3. The system of claim 2 wherein said magnitude of said multiplication factor is limited to a maximum value corresponding to an intermediate pseudo variance lying between a first pseudo variance typical of textured neighborhoods of pixels in said image and a second pseudo variance typical of neighborhoods containing edge features.

4. The system of claim 2 wherein said multiplication factor has a negative value which is a function of an amount by which said pseudo variance is less than said threshold variance whenever said pseudo variance is less than said threshold variance, whereby said system blurs said image in neighborhoods of uniform image regions and sharpens said image in neighborhoods of textured image regions.

5. The system of claim 3 wherein said multiplication factor has a negative value which is a function of an amount by which said pseudo variance is less than said threshold variance whenever said pseudo variance is less than said threshold variance, whereby said system blurs said image in neighborhoods of uniform image regions and sharpens said image in neighborhoods of textured image regions.

6. The system of claim 1 further comprising means for producing the coefficients of said second kernel from the coefficients of said first kernel.

7. The system of claim 6 wherein said means for producing said coefficients of said second kernel comprise means for raising each of said coefficients of said first kernel to a power thereof.

8. The system of claim 7 wherein said power is equal to two.

9. The system of claim 8 wherein said power is a function of said pseudo variance.

* * * * *